United States Patent [19]
Ota et al.

[11] Patent Number: 5,371,763
[45] Date of Patent: Dec. 6, 1994

[54] PACKET MODE DIGITAL DATA A RECEIVER

[75] Inventors: Yusuke Ota, Mountain Lakes; Robert G. Swartz, Tinton Falls, both of N.J.

[73] Assignee: AT&T Corp., Murray Hill, N.J.

[21] Appl. No.: 976,037

[22] Filed: Nov. 13, 1992

[51] Int. Cl.⁵ .......................................... H04L 25/06
[52] U.S. Cl. ...................................... 375/76; 375/98; 327/72
[58] Field of Search ............ 375/76, 98; 307/268, 307/357, 358, 359; 455/239.1, 240.1; 328/149; 330/11

[56] References Cited
U.S. PATENT DOCUMENTS

| Re. 33,665 | 8/1991 | Ogawa | 375/106 |
|---|---|---|---|
| 4,227,155 | 10/1980 | Lerma | 330/11 |
| 4,363,977 | 12/1982 | Tsuda et al. | 307/358 |
| 4,494,241 | 1/1985 | Mayoux | 375/98 |
| 4,714,828 | 12/1987 | Bacou et al. | 330/11 |
| 4,736,391 | 4/1988 | Siegal | 330/11 |
| 4,781,195 | 11/1988 | Martin | 356/41 |
| 4,884,141 | 11/1989 | Hyakutake | 455/239 C |
| 4,905,255 | 2/1990 | Aalaei | 375/98 |
| 4,926,442 | 5/1990 | Bukowski et al. | 375/76 |
| 4,937,842 | 6/1990 | Howell | 375/76 |
| 5,025,176 | 6/1991 | Takeno | 307/359 |
| 5,050,190 | 9/1991 | Shimada et al. | 375/76 |
| 5,119,404 | 6/1992 | Aihara | 375/76 |

Primary Examiner—Stephen Chin
Assistant Examiner—Timothy J. May
Attorney, Agent, or Firm—John A. Caccuro

[57] ABSTRACT

A dc-coupled packet mode digital data receiver, for use with an optical bus, uses a peak detector(s) to adaptively establish an instantaneous logic threshold at the beginning of a data burst. A reset circuit resets the peak detector(s) and other circuits of the receiver in response to an end-of-packet reset signal, thereby enabling the reception of closely-spaced burst date packets which have greatly differing power levels.

29 Claims, 7 Drawing Sheets

PACKET MODE DIGITAL DATA A RECEIVER

CROSS-REFERENCE TO RELATED APPLICATION

Related subject matter is disclosed in the following application filed concurrently herewith and assigned to the same Assignee hereof: U.S. patent application Ser. No. 07/976,039 entitled "Improved Burst Mode Digital Data Receiver".

TECHNICAL FIELD

This invention relates to digital data receivers and more particularly to a receiver for receiving burst mode digital data.

BACKGROUND OF THE INVENTION

A requirement for conventional data transmission is the establishment of well-defined logic thresholds. Metallic wired systems use pre-defined dc logic levels for this purpose. This is unsatisfactory in an optical system where absolute signal levels are not known a priori. The conventional solution is ac-coupling between the receiver and the logic quantizer. With this approach, dc logic threshold levels are established by forming a "signal average" of the received data pulse. Signals above the average are considered as logic ONEs, while signals below the average are logic ZEROs. While ac-coupled receivers work well for continuous data transmission they do not work well for burst mode data transmissions, where the time average of the signal is continuously and unpredictably varying.

By contrast, high-speed, dc-coupled receivers, while ideally suited for burst mode operation, have proven difficult to implement because of the necessity of establishing a logic reference voltage level within a few millivolts of the dc center (one-half of the sum of the minimum and maximum excursions of the data signal) of the received data pulse.

Our prior U.S. Pat. No. 5,025,456 entitled "Burst Mode Digital Data Receiver" and issued Jun. 18, 1991, solved the above problem using a burst mode digital data receiver which adapts to the amplitude of the incoming burst data packet and automatically adjusts the logic threshold voltage to the dc center, ideally during the first bit of the input data burst.

Today, packet data transmissions are now being sent over optical bus communication systems as described in our article entitled "DC-1Gb/s Burst-Mode Compatible Receiver for Optical Bus Applications" by Yusuke Ota, et al., *Journal of Lightway Technology*, Vol. 10, No. 2, February 1992. In a bus system, the above-described problem is elevated to a higher degree of difficulty, because now the bus medium is time shared by many optical transmitters.

These bus systems impose two new constraints on the prior art receivers. The first is that receivers are likely to receive closely-spaced packet data signals from different transmitters which have widely varying power levels. For example, one packet may arrive with power level of −15 dBm, followed a few bits later by another packet with power level of −35 dBm (one hundred times smaller). The receiver has to be able to handle a wide range of packet amplitudes, separated by only a few nanoseconds in time.

Second, because it is difficult to turn a transmitter's laser optical source "on" and completely "off" very quickly, lasers are typically biased so that they are always slightly on. But when many lasers are mounted on a bus, each of them slightly on all the time, the dc "dark level" light that results can easily be more than some of the weaker ac signals you are trying to detect. So, there is a need for some equivalent of a high-pass filter to get rid of sensitivity to dc light levels. The easiest way to introduce a high-pass filter is simply to ac couple the signal. But that reintroduces all the problems with ac coupling that the burst mode receiver was originally intended to solve.

This invention is directed toward solving the first problem while the above recited related application is directed toward solving the second problem.

SUMMARY OF THE INVENTION

In accordance with the present invention, a digital data receiver includes a dc-coupled differential input amplifier circuit for receiving a digital packet data input signal, a detector circuit for detecting and storing a peak amplitude of the signal, and a reset circuit responsive to an end-of-packet reset signal. The reset circuit discharges the stored peak amplitude signal to a non-zero dc voltage substantially equal to the initial dc voltage stored by the detector circuit during the absence of a received input signal. According to another aspect of the present invention, the reset circuit includes both coarse and fine reset circuits which are enabled by the reset signal. The coarse reset circuit discharges the detector circuit at a high rate until the stored voltage is within a predetermined voltage of the initial dc voltage after which it is shut off. The fine reset circuit discharges the detector at a low discharge rate until the initial dc voltage is reached.

In a first embodiment, the reset circuit of the present invention is arranged to operate with the prior art digital data receiver described in our previously referenced U.S. Pat. No. 5,025,456.

In a second embodiment, the reset circuit of the present invention is arranged to operate with the data receiver of our previously referenced related patent application. In such an arrangement, the data receiver includes a dc-coupled differential input amplifier circuit having a first input for receiving the input data signal, a second input for receiving a first reference signal, and an amplifier output. A first peak detector detects and stores the peak amplitude of the amplifier output data signal and generates therefrom the first reference signal. A second peak detector detects and stores a negative (minimum) peak amplitude of the amplifier output data signal and generates therefrom a second reference signal. A dc compensator, in response to the first and second reference signals, shunts away a portion of the dc or low frequency current of the data input signal applied to the first input of the amplifier.

According to the invention, the reset circuit is used to discharge each peak detector to a non-zero dc voltage substantially equal to an initial dc voltage which is stored in said peak detector during the absence of a received data input signal. The reset signal is also used to reset other circuitry of the receiver. The present reset circuit enables the receiver to more effectively handle closely-spaced packet data signals having widely varying power levels.

DETAILED DESCRIPTION

Figure 1:
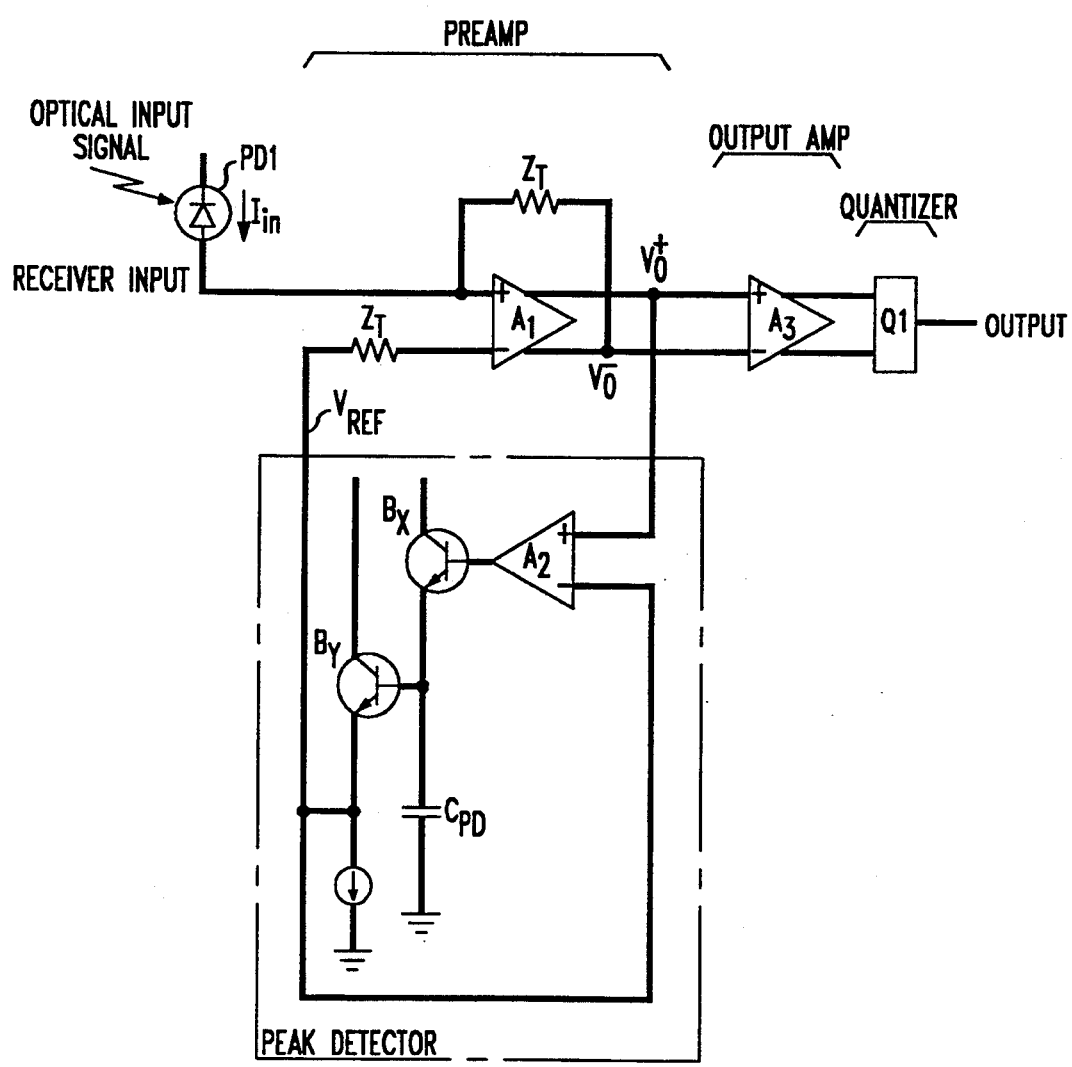
FIG. 1 shows a block diagram of our prior art burst mode receiver circuit of U.S. Pat. No. 5,025,456.
Figure 2:
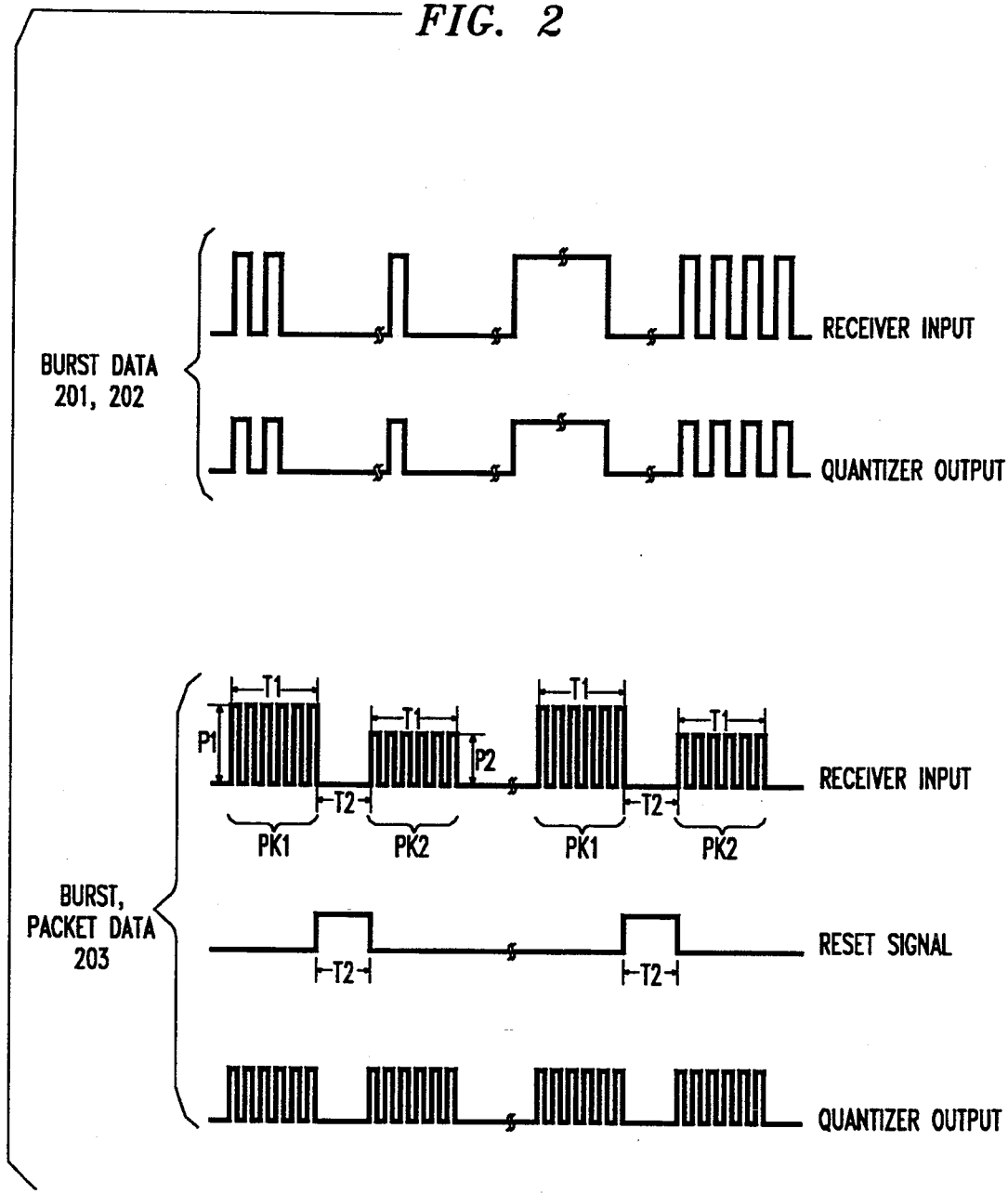
FIG. 2 shows illustrative data wave forms received over an optical communication system operating in one of two modes (1) burst mode, intermittent, single-transmitter source and (2) packet mode, intermittent, multiple transmitter source.

With reference to FIG. 1, we describe the prior art burst mode receiver architecture (disclosed in our U.S. Pat. No. 5,025,456 issued on Jun. 18, 1992, entitled "Burst Mode Digital Data Receiver", and incorporated by reference herein) which establishes an "instantaneous logic threshold", $V_{REF}$, determined at the beginning of each signal burst. This logic threshold level replaces the dc signal average usually established in ac-coupled receivers. The logic threshold $V_{REF}$ is set equal to the half amplitude point of the peak input signal, and subsequent signal amplification is referenced to this level. Threshold determination must be very rapid, and ideally is completed by the conclusion of the first bit in the signal burst. With reference to FIG. 2, a typical burst mode digital data input signal inputted to the burst mode receiver is shown by 201 and the quantizer output is shown by 202.

Returning to FIG. 1, the receiver includes four blocks: a differential input/output transimpedance amplifier ($A_1$), a high speed peak detector ($A_2$), an optional gain amplifier ($A_3$), and a quantizer circuit ($Q_1$). The quantizer circuit $Q_1$ converts the analog signal outputted from the receiver to a clean digital ZERO or ONE signal at a voltage level (e.g., ECL) compatible with the circuits to which it connects.

The operation of the receiver is as follows. With no data present, the peak hold capacitor $C_{PD}$ is discharged. When data arrives, photodetector PD1 produces photocurrent $I_{in}$, the differential output voltage of amplifier $A_1$ becomes $V_0^+ V_0^- = \Delta V_0 = I_{in} Z_T$, where $Z_T$ is the transimpedance (feedback resistor) between the positive input and negative output of $A_1$. One of $A_1$'s differential outputs, and therefore one-half of the net output swing, is sampled by the peak detector and stored on $C_{PD}$. This half-amplitude reference level, $I_{in}Z_T/2$, is applied to the complementary (negative) input of $A_1$, thus establishing the logic threshold $V_{REF}$. The peak detector charges very rapidly, but there may be some pulse width distortion of the output during the first few bits in a burst. Logic level acquisition is accelerated by reducing the size of the peak detector capacitor $C_{PD}$. However, $C_{PD}$ is used also to stabilize the peak detector feedback loop around $A_1$ and $A_2$. If $C_{PD}$ is too small, then peak detector loop instability results.

Figure 3:
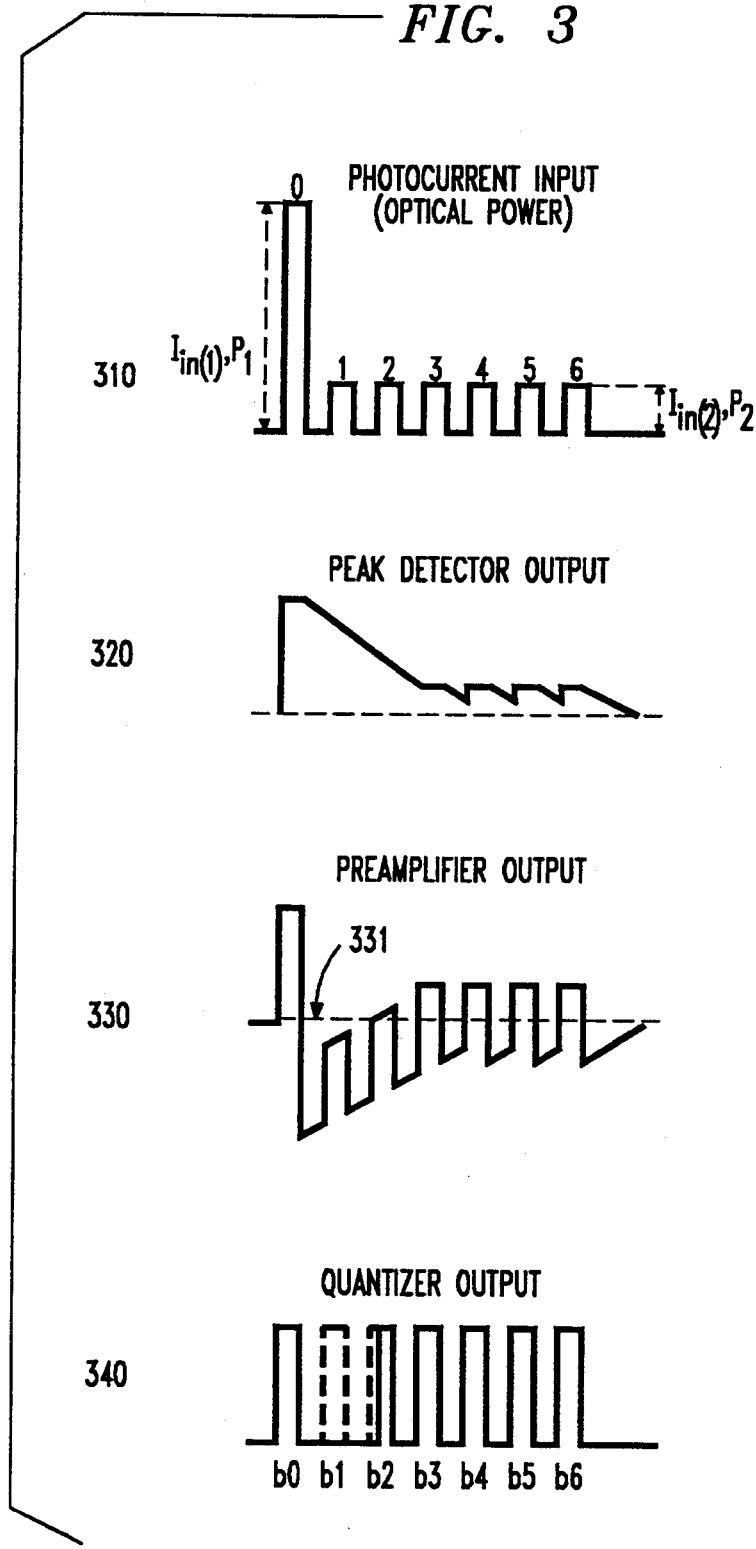
FIG. 3 shows illustrative photo current input, peak detector output, preamplifier output, and decision circuit (quantizer) output for the circuit of FIG. 1 operated in the packet mode.

In an optical bus application of the receiver of FIG. 1, two new problems arise. First, optical packets with widely varying signal amplitudes can appear, closely spaced on the bus. With reference to FIG. 2, this is shown by 203 where the packets PK1 (from a first transmitter) and PK2 (from a second transmitter) may have the same time slot width T1 and where packets PK1 have significantly higher signal amplitudes than the packets PK2. In the circuit of FIG. 1, after a large amplitude packet PK1 threshold has been stored on $C_{PD}$, then the circuit may not distinguish a small amplitude packet PK2 from noise. Therefore, such packets must be separated by a long enough time interval (e.g., T2 shown in 203) to allow $C_{PD}$ to discharge. The problem is illustrated in FIG. 3. As shown in 310 the photocurrents $I_{in(1)}$ and $I_{in(2)}$ are proportional to the received optical signal powers $P_1$ and $P_2$, and $I_{in(1)}$ is much larger than $I_{in(2)}$. In this case, 320, the peak detector output is determined by the first large $I_{in(1)}$ signal (pulse 0), and is too large for the peak of the first following $I_{in(2)}$ pulse (pulse 1) to reach the logic slicing level 331, of the quantizer circuit $Q_1$. Then, as shown by 340, the quantizer circuit $Q_1$ output bit 1 is completely missing, (shown as dotted pattern) and bit 2 suffers a large pulse width distortion (in this example).

Figure 4:
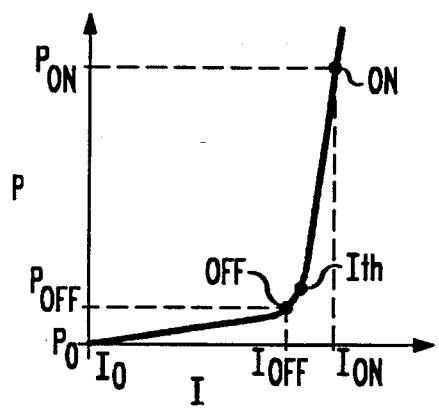
FIG. 4 shows an illustrative curve having laser luminosity (or optical output P) as a function of laser current.

A second problem in optical bus applications is the low frequency "dark level" optical power. With reference to FIG. 4 we illustratively depict the operating levels of a laser diode. It is impractical to modulate a transmitter's laser diode between its "true" OFF (i.e., $P_0, I_0$) and its ON (i.e., $P_{on}, I_{on}$) states at high speed. Consequently, lasers are typically biased OFF at a current $I_{off}$ (slightly below the lasing threshold current ($I_{th}$)) where there is some light output ($P_{OFF}$) even in the OFF state. Extinction ratios ($P_{on}/P_{off}$) of 10–20 are typical. Therefore, with many lasers on a bus, the dark (all off) light level could be $NP_{off}$, where N is the number of lasers. This light-level approaches the ON-state light-level of an individual laser. Moreover, because of the 100:1 permissible variation in received optical power from packet to packet, it is possible that the optical power of the dark level signal could exceed the burst signal level of some packets by a significant factor.

Figure 5:
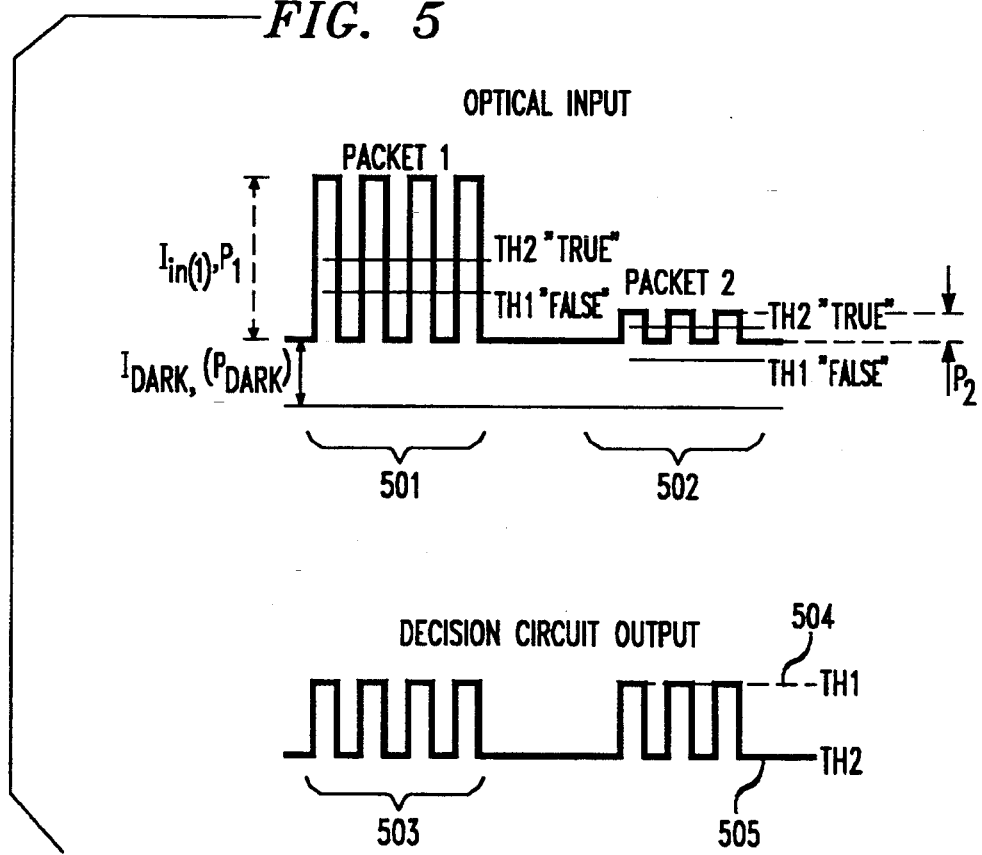
FIG. 5 shows the photo current (optical) input and decision circuit receiver output for the circuit of FIG. 1 in the case when the "dark current" (essentially a dc current) is non-zero. "TH2" represents the "true" or ideal logic thresholds at the center of the ac signal swing; "TH1" is the false logic threshold established at half the total input amplitude, including the dark current.

In the present dc-coupled packet data receiver architecture, logic threshold is $I_{in}Z_T/2$, where $I_{in}$ is the input signal corresponding to the maximum optical signal input $P_{in}$. With reference to FIG. 5, in the presence of dark level current, a "false" logic threshold TH1 equal to $(I_{dark}+I_{in})Z_T/2$ is established rather than the "true" logic threshold TH2 equal to $I_{in}Z_T/2$. When $I_{dark} < I_{in}$, as shown by 501, proper input signal detection is still probable, as shown by 503. However, when $I_{dark} \geq I_{in}$, then, as shown by 502, the false threshold TH1 would cause the input signal to be improperly detected, as shown by 504, rather than being properly detected, as shown by 505.

Figure 6:
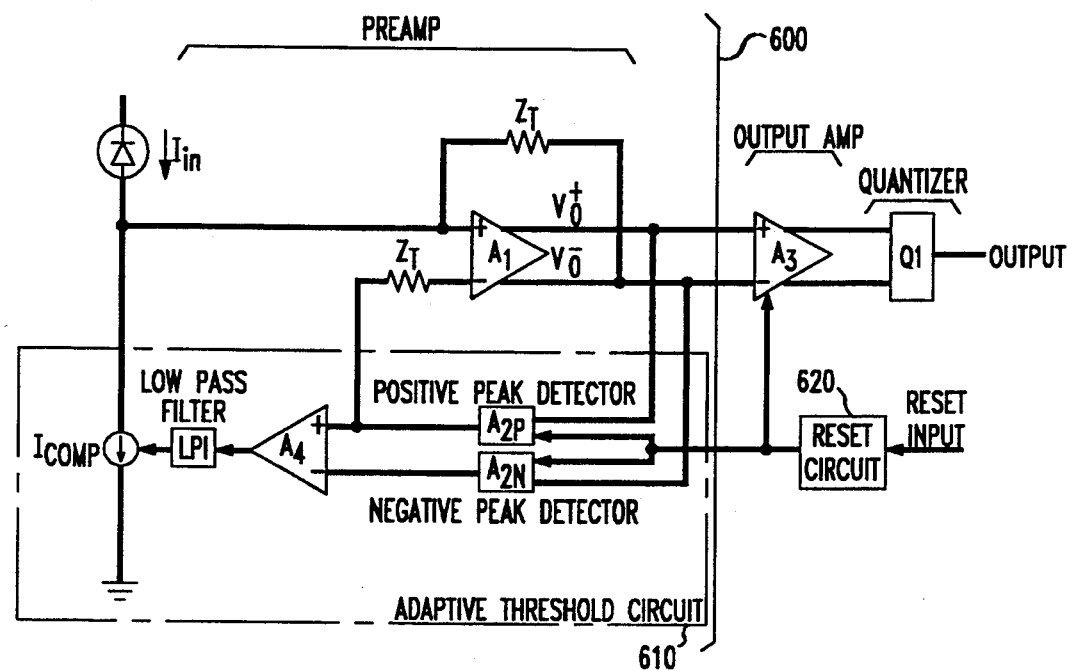
FIG. 6 is a block diagram of a "Packet Data Receiver" in accordance with the present invention which includes an Adaptive Threshold Circuit modified to handle "dark level" input currents, and a Reset circuit which enables the reception of closely-spaced data packets of differing power levels.

A simplified functional diagram of our new circuit is shown in FIG. 6. The preamp, corresponding to $A_1$ in FIG. 1, is a differential input/output transimpedance amplifier. The Adaptive Threshold Circuit 610 is a modified, enhanced version of the peak detector ($A_2$, $B_X$, $B_Y$, $C_{PD}$) in FIG. 1. The Output Amplifier corresponds to $A_3$, and the Packet Threshold Reset Circuitry (hereinafter Reset circuit) 620 is a new function, added to allow zeroing of the peak detector capacitor between data packets. The new capabilities are described in the following sections. The Reset function is introduced to each peak detector circuit and allows rapid and precise zeroing of the peak detector capacitor. By activating the Reset circuit 620 at the conclusion of a data packet (T2 of FIG. 2), the receiver is prepared to establish a new logic threshold (e.g., at a substantially reduced level) after a short reset interval. The dark level light problem is handled by a "dark level compensator" (Darcom) circuit (includes preamp $A_1$ and Adaptive Threshold Circuit 610) which measures and shunts or subtracts out the low frequency input signal ($I_{comp}$) portion of $I_{in}$. Moreover, the peak detector circuits ($A_{2P}$, $A_{2N}$), as described later, are modified to increase stability and improve the accuracy of peak detector tracking.

DARK LEVEL COMPENSATOR (DARCOM) CIRCUIT

A block diagram of the dark level compensator (Darcom) circuit 600 is shown in FIG. 6. Darcom circuit 600 consists of the input amplifier $A_1$, a positive peak detector $A_{2P}$, a negative peak detector $A_{2N}$, a comparison amplifier, $A_4$, and a low pass filter LP1. Detector $A_{2P}$ samples the peak value of the positive output of amplifier $A_1$. Detector $A_{2N}$ samples the peak value of the negative output of amplifier $A_1$. Because of the differential outputs, ($V_0^+$ and $V_0^-$) of amplifier $A_1$, the positive and negative peak detectors, $A_{2P}$ and $A_{2N}$, can be implemented as identical circuits, thus assuring matching of tracking accuracy, and improving overall precision. Detector $A_{2P}$ is used with amplifier $A_1$ to set a logic threshold equal to half the maximum input swing (e.g., TH2 of FIG. 5).

Figure 7:
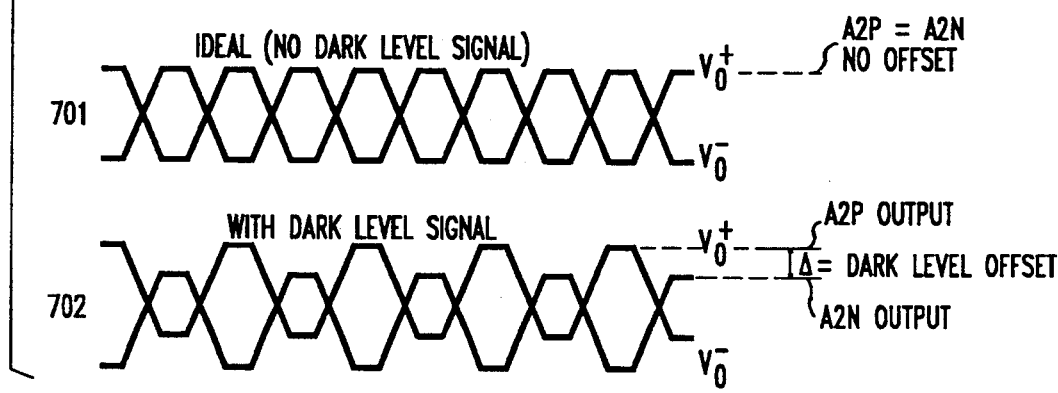
FIG. 7 shows representative output signal levels for preamp $A_1$ and the corresponding levels for peak detectors $A_{2P}$ and $A_{2N}$ in the cases where dark level signal is and is not present.

The Darcom circuit 600 relies on the spectral characteristics of the peak detector circuits ($A_{2P}$, $A_{2N}$). In the higher frequency range, bounded on the lower end by the discharge time of the peak detector capacitors, the peak detectors ($A_{2P}$, $A_{2N}$) act as peak sampling circuits with unity gain. At low frequencies, however, the peak detector capacitors have enough time to discharge, and consequently $A_{2P}$ and $A_{2N}$ are simply unity gain amplifiers. While the outputs of $A_{2P}$ and $A_{2N}$ do track low frequency variations in the input current $I_{in}$, the following, for simplicity, refers to these low frequency variations as the "dc" $I_{dark}$ current. Thus, $A_{2P}$ and $A_{2N}$ apply the peak values of the positive and negative outputs ($V_0^+$ and $V_0^-$) of amplifier $A_1$ as inputs to comparison amplifier $A_4$. As shown in FIG. 7, these peak detector outputs ($V_0^+$ and $V_0^-$) consist of the sum of a high frequency common signal peak and a low frequency difference signal (dark level offset). Thus, in the absence of a dark level offset signal the peak detector $A_{2P}$, $A_{2N}$ outputs appear, as shown by the dotted voltage levels in 701, while waveforms 702 depict the outputs in the presence of a dark level offset signal $\Delta = A_{2P} - A_{2N}$. In turn, $A_4$ together with low pass filter LP1 converts this into a "dc difference" signal, ($I_{comp}$) which is subtracted from the input signal $I_{in}$. Thus, a dc (or low frequency) feedback loop is established in Darcom circuit 600 that forces the dc (or low frequency) signals' differential output of $A_1$ to zero, cancelling out the input dark current ($I_{dark}$) along with any other dc offset signals (or low frequency offset signals). Such other dc offset signals may be derived from the outputs $V_0^+$ and $V_0^-$ of amplifier $A_1$ or from peak detectors $A_{2P}$ or $A_{2N}$. Low pass filter LP1 serves to stabilize the Darcom feedback loop, and also to average out fluctuations in the dark level signal.

If the logic threshold has been properly established by the positive peak detector $A_{2P}$ as $I_{in} Z_T / 2$, (as shown by TH2 of FIG. 4) then the differential outputs of $A_1$ swing symmetrically above and below the logic threshold. Accordingly, the magnitude of the positive and negative peaks will be equal. Therefore, the outputs of $A_{2P}$ and $A_{2N}$ will also be equal, thus the differential voltage into amplifier $A_4$ is zero and hence inducing no net change in $I_{comp}$ at the output of comparison amplifier $A_4$. This is illustrated as the "ideal" case 701 in FIG. 7.

In effect, Darcom circuit 600 ignores high frequency inputs, while forcing the dc (or low frequency) output component to zero. Proper operation of Darcom circuit 600 depends on accurate tracking and matching of the two peak detectors $A_{2P}$ and $A_{2N}$. If the positive peak detector $A_{2P}$ is inaccurate, then an improper logic threshold may be established, and the peak detector outputs will not be symmetric. This is illustrated by the wave forms 702 in FIG. 7. This may manifest itself as an offset in the differential PreAmp $A_1$ output voltage ($V_0^+ - V_0^-$). Likewise, if the peak detectors $A_{2P}$ and $A_{2N}$ do not precisely match each other, then the mismatch will again appear as a PreAmp A1 output offset. Such differential offset voltages would tend to reduce amplifier sensitivity or even to generate false digital logic ZERO or ONE signals. Note also that even if the peak detectors $A_{2P}$ and $A_{2N}$ are accurate and precisely matched, the present scheme introduces constraints on the data format. In particular, the input data sequence must include enough ONEs and ZEROs to properly charge and maintain charge on the two peak detectors. Such restrictions are most relaxed when the peak detectors charge very rapidly and hold the charge for as long as possible.

With the scheme described here, there is in principle no limit on the allowed size of the dark current $I_{dark}$ except for noise considerations. Moreover, even though the Darcom circuit 600 subtracts the low frequency part of the input spectrum from the main signal path, the information there is still available for other purposes (e.g. monitoring) at the $A_4$ output.

PEAK DETECTORS $A_{2P}$ and $A_{2N}$

Two modifications were made to the prior art peak detector circuitry shown in FIG. 1 to improve tracking and feedback loop stability. In the following discussion since peak detectors $A_{2P}$ and $A_{2N}$ employ similar circuitry and operate in a similar manner, we describe only the operation of positive peak detector $A_{2P}$. The following paragraphs make joint reference to FIGS. 1 and 8. Note the dotted line blocks 860 and 870, as will be described in a later paragraph, illustrate an alternate embodiment for receiving input voltage signals.

Figure 8:
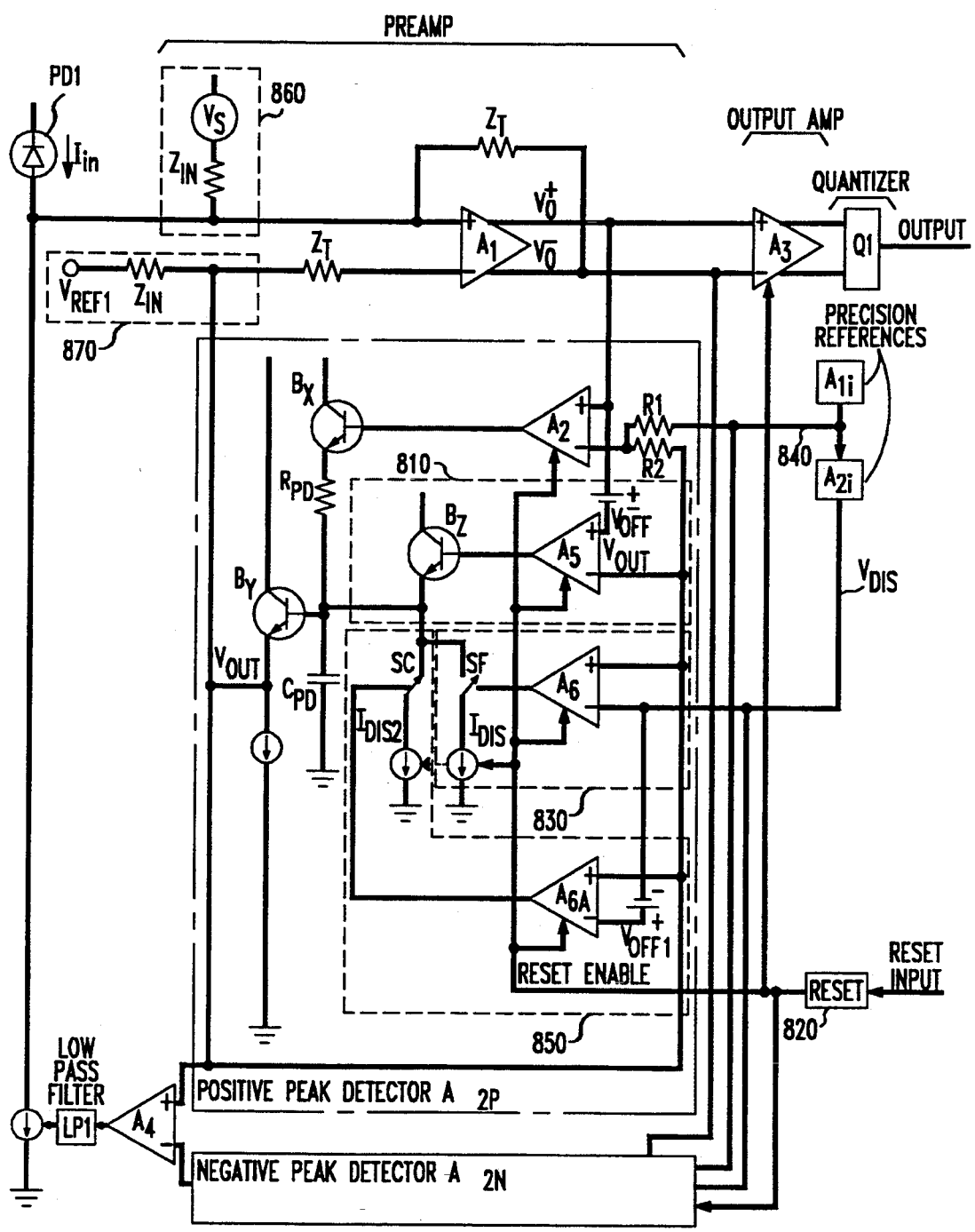
FIG. 8 is a more detailed block diagram of the present invention illustrating the details of the two identical peak detectors each having a Boosted Slew Circuit and the Reset circuit including a peak detector discharge circuit and precision references.

To improve tracking accuracy, the gain of peak detector circuit $A_{2P}$ was increased slightly. For the peak detector circuit shown in FIG. 1, the fractional tracking error $(V_{in}-V_0)/V_{in}$ is $1/(1+A)$, where A is the open loop gain of the amplifier $A_2$, and $V_{in}$ and $V_0$ are the input and output signals of the peak detector consisting of $A_2$, $B_X$, $B_Y$, and $C_{PD}$. The error is reduced with increasing gain A, but it never goes to zero. A way to minimize the error is to introduce a small amount of gain into the peak detector as shown in FIG. 8. It is easy to show that for $A=1+R1/R2$, the fractional tracking error is eliminated.

A second modification was incorporated to improve the stability of the peak detector feedback loop. Referring again to FIG. 1, this loop is identified as the path leading from the positive output of $A_1$ through the peak detector and then back to the negative input of $A_1$. Stability requires that there be a single dominant pole in this feedback loop. This is normally designed to be set by the peak detector capacitor $C_{PD}$ in series with the emitter drive resistance of transistor $B_X$. Unhappily, there are many other poles in this loop, including the amplifier poles of $A_1$ and $A_2$, as well as the input poles of $A_1$. Moreover, the driving resistance of $B_X$ is very small, and consequently a large capacitor $C_{PD}$ is needed to establish a dominant pole. Stability of this loop can become marginal.

We improve stability by increasing either $C_{PD}$ or the emitter drive resistance of $B_X$. Unfortunately, if either is increased, then the peak detector charging time is increased and circuit operation is impaired. So, it seems that we are left with a choice between feedback loop instability or slow peak detector charging. According to another aspect of the invention we recognize that the peak detector $A_{2P}$ operates in one of two modes: (1) charging or (2) maintenance. In the charging mode, the positive input to amplifier $A_2$ is greater than the negative input, and the circuit responds by pumping charge into the peak detector capacitor $C_{PD}$. In the charging mode, the circuit is "slew limited". Equivalently, the loop gain is zero, and thus stability is not at issue. In the maintenance mode, the positive and negative inputs to amplifier $A_2$ are approximately equal, and the charge pump $B_X$ on average provides just enough current to balance the discharge current (base current of $B_Y$). In this mode, stability is an issue, and must be assured.

According to another aspect of the present invention, stability is improved by putting a large series resistance $R_{PD}$ in series with the charging transistor $B_X$, as shown in FIG. 8. This lowers the frequency of the dominant pole, now determined approximately by $R_{PD}$ and $C_{PD}$. The impaired charging characteristic that results is remedied by introducing a "slew booster" circuit 810, shown as amplifier $A_5$ and charging transistor $B_Z$ in FIG. 8. The slew booster circuit 810 charges $C_{PD}$ directly, without a limiting series resistor. However, the input to amplifier $A_5$ is offset slightly ($V_{OFF}$) with respect to the input of $A_2$. Consequently, the slew booster turns on only when the difference between the input $V_0^+$ and the stored output $V_{OUT}$ is large, i.e. $>V_{OFF}$. When the voltage stored on $C_{PD}$ charges to within $V_{OFF}$ of the final value, the slew booster circuit 810 turns off, and the main peak detector amplifier $A_2$ charges $C_{PD}$ the rest of the way to equilibrium. Thus, the slew booster circuit 810 is "on" only when the circuit is in the charging mode. When the circuit is in the maintenance mode, the slew booster circuit 810 is off, and therefore does not affect overall feedback loop stability.

RESET CIRCUIT

With reference to 203 of FIG. 2, the Reset circuit, in response to an end-of-packet Reset signal, is designed to discharge both the positive and negative peak detector circuits $A_{2P}$ and $A_{2N}$ very rapidly so that data packets (PK1, PK2) differing in amplitude by approximately 100:1 (P1/P2) can be separated by a time interval (T2), illustratively, as short as four bit periods (this would be approximately 130 ns for a 30 Mb data signal). This interval T2, shown in 203 of FIG. 2, is defined as the "Reset interval." With reference to FIG. 8, the Reset circuit includes a common Reset Enable Circuit 820 which generates a Reset enable signal from a reset signal and a Reset Discharge circuit 830 which is part of each peak detector circuit (830 is shown only for positive peak detector $A_{2P}$)

The Reset circuit provides the following attributes: speed, precision, "clamp" function, power conservation and CMOS/TTL input levels.

The first attribute, speed, is obtained by discharging or clamping the peak detector capacitor $C_{PD}$ as rapidly as possible. This requires, simply, a large discharge current ($I_{DIS}$). The second necessary attribute, precision, complicates the problem by requiring that the discharge current $I_{DIS}$ (clamping function) be turned-off immediately when the peak detector capacitor $C_{PD}$ voltage has reached its starting (no data present) value. That starting value is not zero volts, because of the initial bias voltages within the peak detector circuit $A_{2P}$. The clamp function is necessary to rum the peak detector charging circuitry (i.e., amplifiers $A_2$ and $A_5$) off during the Reset interval, and likewise to turn-off the discharge circuitry (i.e., amplifier $A_6$) during all but the Reset period. The clamp circuit also is used to force the packet receiver output (i.e., amplifiers $A_3$) to a well-defined logic state during the Reset interval. Obviously, if amplifier $A_3$ is part of quantizer circuit $Q_1$, then quantizer $Q_1$ would be reset by the clamp function. Power conservation and CMOS/TTL input levels are system requirements.

The Reset Discharge circuit 830 operates as follows. Comparator amplifier $A_6$ compares the voltage across $C_{PD}$ with a precision reference voltage, $V_{DIS}$. If it exceeds the reference voltage, $V_{DIS}$ then switch $S_F$ is closed and the discharge current $I_{DIS}$ is drawn from $C_{PD}$. The precision reference $V_{DIS}$ is implemented as a two stage image circuit. The voltage $V_{DIS}$ essentially represents the initial output voltage $V_{OUT}$, when no input data is being received by the receiver of FIG. 8. The first stage, $A_{1i}$, is a copy of input amplifier $A_1$, while the second stage, $A_{2i}$, is a copy of peak detector circuit $A_2$. (Note: The gain enhancing resistor, R1, used within the peak detector amplifier $A_2$, is referenced to the output 840 of the first image stage, $A_{1i}$). Because $I_{DIS}$ is very large, in order to discharge capacitor $C_{PD}$ rapidly, the time delay through the amplifier $A_6$ discharge loop must be short, or the capacitor $C_{PD}$ will be discharged too far. Likewise, the gain of amplifier $A_6$ must be large to assure a precision discharge. Fortunately, stability is not a concern for the amplifier $A_6$ loop because it can only discharge the capacitor, $C_{PD}$ not charge it; i.e. there is no restoring force to cause oscillation.

The clamping function is effected by the Reset block 820 in FIG. 8. This circuit block translates the Reset input signal into the Reset enable clamping signals, and also turns on and off the discharge current, $I_{DIS}$. This conserves power by minimizing power consumption of the Reset Discharge Circuit 830 at times when the Reset input signal is not present.

In an alternate embodiment a Reset discharge circuit may include a coarse discharge circuit 850 and a fine discharge circuit 830 (Note, using Reset discharge circuit 830 for the fine discharge circuit requires adjusting the discharge current source $I_{DIS}$ to a smaller current value). The coarse discharge circuit 850 operates like the previously described discharge circuit 830 except that it is not activated unless the difference between voltage $V_{out}$ and $V_{Dis}$ exceeds the offset voltage $V_{OFF1}$. When activated, coarse discharge circuit 850 enables switch $S_C$ to connect current source $I_{DIS2}$ discharge capacitor $C_{PD}$. Note, that the fine discharge circuit 830 is also activated since $V_{out}$ is greater than $V_{DIS}$. Hence, when $V_{OUT}$ is greater than $V_{DIS}+V_{OFF1}$ both the coarse discharge circuit 850 and fine discharge circuit 830 are discharging capacitor $C_{PD}$ at the same time. Since $I_{DIS2}$ is much greater than $I_{DIS}$, it essentially controls the discharge rate.

Once the voltage $V_{OUT}$ decreases and reaches the value $V_{DIS}+V_{OFF1}$, the coarse discharge circuit 850 switches off the current source $I_{DIS2}$ from capacitor $C_{PD}$. Thereafter, only fine discharge circuit 830 is discharging capacitor $C_{PD}$, ensuring a slower more accurately controllable discharge rate. Using the combined coarse and fine discharge circuits enables the Reset discharge circuit to 1) quickly discharge capacitor $C_{PD}$ of the peak voltage from a high power level packet data and 2) be able to very accurately discharge capacitor $C_{PD}$ down to the desired voltage $V_{DIS}$. For low power packet data, the coarse discharge circuit 850 may not be utilized at all. The end result is that the Reset discharge circuit enables the discharge rate to be increased (ensuring fast discharge) without sacrificing the accuracy of controlling the final discharge voltage. This arrangement allows the Reset circuit to discharge $C_{PD}$ rapidly and precisely without overshooting due to too great a discharge rate. The fast discharge rate ensures that the receiver can reset within a few bit times for a data rate which may vary from the tens to hundreds of megabits/s. The accuracy of setting the final discharge voltage of capacitor $C_{PD}$ ensures that the receiver's dynamic input signal range for adjacent packet data power levels can be about 100 to 1. That is, the receiver can detect a low level packet data signal which immediately follows a high level packet data signal which is 100 times as large as the low level signal.

Figure 9:
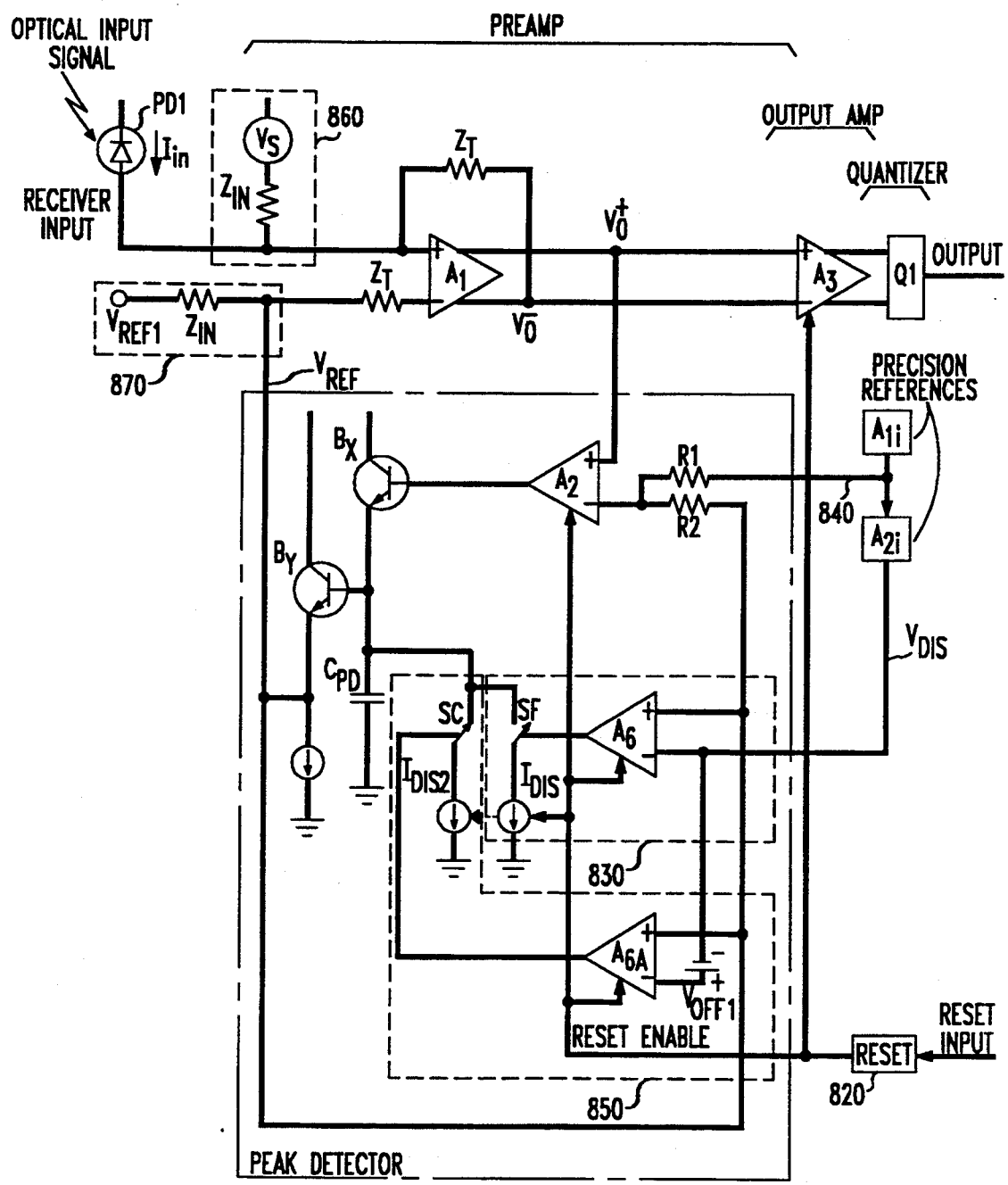
FIG. 9 shows a block diagram of our prior art burst mode receiver circuit of U.S. Pat. No. 5,025,456 adapted to incorporate the reset circuit in accordance with the present invention.

With reference to FIG. 9 there is shown an embodiment of the Reset circuit of the present invention for use in the prior art circuit of FIG. 1. In such an embodiment, the Reset circuit includes the Reset Discharge Circuits 830 and 850, Reset Enable Circuit 820, precision references $A_{1i}$ and $A_{2i}$, and resistors R1 and R2 interconnected as shown. Since the Reset circuit 830 and 850 shown in FIG. 9 is implemented using the same circuitry and operates in the same way as previously described with reference to FIG. 8, it is not further described herein.

While the disclosed implementation of our digital data receiver utilizes a transimpedance preamp $A_1$ having a differential output, it should be understood that an amplifier having a single ended output could also be used. In such an embodiment, the output amplifier $A_3$ would then have a single input. Moreover, in such an embodiment, negative peak detector $A_{2N}$ would become a "minimum level" detector utilizing PNP type transistors in place of the NPN type transistors utilized for $B_X$, $B_Y$ and $B_Z$. Thus, detector $A_{2N}$ would then form a minimum level voltage representing the minimum signal (rather than the maximum voltage representation of the negative peak voltage which is produced in the disclosed embodiment). In this case, the dark level offset is determined by the difference between the output of $A_{2N}$ and a new reference voltage which is analogous to the output of image circuit $A_{1i}$, i.e., the amplifier A output with no dark level signal present. The comparison amplifier $A_4$ would then remain a difference amplifier that would take the difference between the minimum peak voltages outputted from detector $A_{2N}$ and this new reference. The difference amplifier together with a low pass filter would then produce the dc current $I_{comp}$ which is subtracted or shunted from $I_{in}$ prior to input to amplifier $A_1$.

Additionally, the present invention could be used with voltage input signals (rather than current input signals) by changing amplifier $A_1$ from a transimpedance amplifier to a voltage amplifier. This is accomplished by replacing photodetector $P_{D1}$ with a voltage signal source $V_S$ of specified output impedance. Such an arrangement would replace photodetector $P_{D1}$ with the circuitry shown in the dotted blocks 860 and 870, where the voltage source $V_{REF1}$ is a dc bias voltage and the voltage source $V_S$ is the input voltage signal. The resistors $Z_{IN}$ in 860 and 870 convert amplifier $A_1$ from a transimpedance amplifier to a voltage amplifier.

In the disclosed embodiment, the analog circuit blocks are actually either well-known ECL gates, or simple modifications of ECL gates. The ECL gate consists of a differential pair with current source load, followed by an emitter follower stage. These circuits, while offering limited gain, are inherently very fast. The input amplifier, output amplifier, peak detectors $A_{2P}$ and $A_{2N}$, amplifiers $A_5$ and $A_6$, and precision references $A_{1i}$ and $A_{2i}$ may be implemented using circuits which are described in more detail in our previously referenced article.

While the disclosed embodiment of the present invention is implemented using bipolar integrated circuit technology, it should be noted that other circuit technologies could be utilized, including FET.

The circuit can be implemented using, for example, silicon, gallium arsenide or other appropriate semiconductor materials. Moreover, it is contemplated that other well-known circuits can be used to implement the amplifier circuit functions shown in FIG. 8 without departing from the teaching of the present invention.

Additionally, while the present invention was described as a receiver for use in a burst mode operated packet data system, it could be utilized in a system that utilizes continuous data transmissions. Although the present invention has been described for use with optical signals, it should be understood that the present invention can be utilized in non-optical signals as well.

Thus, what has been described is merely illustrative of the application of the principles of the present invention. Other methods and circuits can be implemented by those skilled in the art without departing from the spirit and scope of the present invention.

We claim:

1. A digital data receiver comprising a dc-coupled differential input amplifier circuit having first input means for receiving a digital packet data input signal, second input means for receiving a reference signal, and output means for outputting a data output signal;

a detector means for detecting and storing a peak amplitude of said data output signal and for generating said reference signal; and reset means, responsive to an end-of-packet reset signal, for discharging said peak amplitude of said data output signal stored by said detector means to a non-zero dc voltage substantially equal to a dc bias voltage which corresponds to a voltage stored by said detector means during an absence of a received data input signal.

2. The receiver of claim 1 wherein said reset means includes course reset means for discharging said stored data output signal at a high discharge rate until it is within a predetermined voltage difference of said dc bias voltage; and fine reset means for discharging said stored data output signal at a low discharge rate, until said dc bias voltage is reached.

3. The receiver of claim 1 wherein said first detector means includes capacitor means for storing the peak amplitude of said data output signal and wherein said reset means includes switchable current source means for discharging said capacitor means in response to said reset signal and switchable so that it is off at all other times.

4. The receiver of claim 3 wherein said reset means has a first power consumption during said reset signal and has a second power consumption, which is less than said first power consumption, during the absence of said reset signal.

5. The receiver of claim 3 wherein said switchable current source means has a capacity to substantially discharge said capacitor within no more than four bit time periods of said data input signal.

6. The receiver of claim 3 wherein said switchable current source means includes a comparator amplifier having a first input connected to said reference signal and a second input connected to a second reference signal equal to said dc bias voltage, an output of said comparator amplifier controlling said switchable current source means to discharge said capacitor means when said reference signal exceeds said second reference signal.

7. The receiver of claim 6 wherein said comparator means is arranged to discharge said capacitor means to said dc bias voltage which is less than one percent of the difference between the peak amplitude of said data output signal and said reference signal.

8. The receiver of claim 6 wherein said reference signal is generated using a pair of reference amplifier circuits, a first reference amplifier circuit being implemented identical to and operating under identical operating conditions as said differential amplifier circuit and a second reference amplifier circuit being implemented identical to and operating under identical operating conditions as said first detector means, said first and second reference amplifier circuitry being interconnected in the same manner as said differential amplifier circuit and said first detector means.

9. The receiver of claim 1 further including output amplifier means having an input connected to said input amplifier circuit output means and an output for providing a receiver output signal and means for disabling said output amplifier means in response to said reset signal.

10. The receiver of claim 1 implemented as part of an integrated circuit.

11. The receiver of claim 1 wherein said data input signal is a current signal and wherein said input amplifier circuit is a transimpedance amplifier circuit.

12. The receiver of claim 1 wherein said data input signal is a voltage signal and wherein said input amplifier circuit is a voltage amplifier circuit.

13. A digital data receiver comprising a dc-coupled differential input amplifier circuit having first input means for receiving a digital packet data input signal, second input means for receiving a first reference signal, and output means for outputting a data output signal;

detector means for detecting and storing a peak amplitude of said data output signal and for generating said first reference signal;

first reset means, responsive to an end-of-packet reset signal, for discharging said data output signal stored by said detector means to a dc bias voltage which is within a predetermined voltage difference of a second reference voltage; and second reset means, responsive to said end-of-packet reset signal, for discharging said peak amplitude of said data output signal stored by said detector means to said second reference voltage wherein said second reference voltage corresponds to a voltage stored by said detector means during an absence of a received data input signal.

14. A digital data receiver comprising a dc-coupled differential amplifier circuit having first input means for receiving a digital data input signal, second input means for receiving a reference signal, and output means for outputting a data output signal;

first detector means for detecting and storing a peak amplitude of said data output signal and for generating said first reference signal; and second detector means for detecting and storing a second peak amplitude of said data output signal and for generating a second reference signal;

means, responsive to said first and second reference signals, for shunting a portion of a dc or low frequency current of said data input signal from said first input means; and reset means, responsive to an end-of-packet reset signal, for discharging said first and second peak amplitudes stored, respectively, by said first and second detector means to a non-zero dc voltage substantially equal to a dc bias voltage which corresponds to a voltage stored by said first and second detector means during an absence of a received data input signal.

15. The receiver of claim 14 wherein said reset means includes coarse reset means for discharging said stored data output signal on each detector means at a first discharge rate until it is within a predetermined voltage difference of said dc bias voltage; and fine reset means for discharging said stored data output signal at a second discharge rate, smaller than said first rate, until said dc bias voltage is reached.

16. The receiver of claim 14 wherein said first and second detector means each includes capacitor means for storing the peak amplitude of said data output signal and wherein said reset means includes separate switchable current source means for each detector means for discharging the capacitor means in response to said reset signal and switchable so that it is off when said reset signal is not present.

17. The receiver of claim 16 wherein said reset means has a first power consumption during said reset signal and has a second power consumption, which is less than said first power consumption, during the absence of said reset signal.

18. The receiver of claim 16 wherein each switchable current source means has a capacity to substantially discharge its capacitor within no more than four bit time periods of said data input signal.

19. The receiver of claim 16 wherein each switchable current source means includes a comparator amplifier having a first input connected to said first reference signal and a second input connected to a third reference signal, equal to said dc bias voltage, an output of said comparator amplifier controlling said switchable current source means to discharge said capacitor means when said first reference signal exceeds said third reference signal.

20. The receiver of claim 19 wherein said comparator means is arranged to discharge the capacitor means to said dc bias voltage which is within a one percent of the difference between the peak amplitude of said data output signal and said third reference signal.

21. The receiver of claim 19 wherein said third reference signal is generated using a pair of reference amplifier circuits, a first reference amplifier circuit being implemented substantially identical to and operating under substantially identical operating conditions as said differential amplifier circuit and a second reference amplifier circuit being implemented substantially identical to and operating under substantially identical operating conditions as said first detector means, said first and second reference amplifier circuitry being interconnected in the same manner as said differential amplifier circuit and said first detector means.

22. The receiver of claim 14 further including output amplifier means having an input connected to the output means of said input amplifier circuit and an output for providing a receiver output signal and means for disabling said output amplifier means in response to a reset signal from said reset means.

23. The receiver of claim 14 wherein said output means of said input amplifier circuit includes a first and second differential output means;

said first detector means connects to said first output means; and said second detector connects to said second output means.

24. The receiver of claim 23 wherein said first and second detector means are each implemented using identical circuit apparatus and operating under identical operating conditions and which are implemented as part of an integrated circuit.

25. The receiver of claim 14 wherein said digital data input signal is a current signal and wherein said input amplifier circuit is a transimpedance amplifier circuit.

26. The receiver of claim 14 wherein said digital data input signal is a voltage signal and wherein said input amplifier circuit is a voltage amplifier circuit.

27. An optical signal receiver comprising means for receiving a digital optical signal, means for converting the received digital optical signal into an electronic data signal, a dc-coupled differential input amplifier circuit having first input means for receiving said electronic data signal, second input means for receiving a first reference signal, and output means for outputting a data output signal;

first detector means for detecting and storing a first peak amplitude of said data output signal and for generating said first reference signal;

second detector means for detecting and storing a second peak amplitude of said data output signal and in response thereto shunting a portion of a current from said data input signal, said current having a frequency which is less than a predetermined frequency; and reset means, responsive to an end-of-packet reset signal, for discharging said first and second peak amplitudes stored, respectively, by said first and second detector means to a non-zero dc voltage substantially equal to a dc bias voltage which corresponds to a voltage stored by said detector means during an absence of a received data input signal.

28. An optical signal receiver comprising means for receiving a digital optical signal, means for converting the received digital optical signal into an electronic data signal, a dc-coupled differential input amplifier circuit having first input means for receiving said electronic data signal, second input means for receiving a reference signal, and output means for outputting a data output signal;

detector means for detecting and storing a peak amplitude of said data output signal and for generating said reference signal; and reset means, responsive to an end-of-packet reset signal, for discharging said data output signal stored by said detector means to a non-zero dc voltage substantially equal to a dc bias voltage which corresponds to a voltage stored by said detector means during an absence of a received data input signal.

29. A digital data receiver comprising a dc-coupled differential amplifier circuit having first input means for receiving a digital data input signal, second input means for receiving a first reference signal, and output means for outputting a data output signal;

first detector means for detecting and storing a peak amplitude of said data output signal and for generating said first reference signal;

second detector means for detecting and storing a second peak amplitude of said data output signal and for generating a second reference signal;

means, responsive to said first and second reference signals, for shunting a portion of a current of said data input signal from said first input means, said current having a frequency which is less than a predetermined frequency;

first reset means, responsive to an end-of-packet reset signal, for discharging said data output signal stored by said first detector means to a dc voltage which is within a predetermined voltage difference of a third reference voltage; and second reset means, responsive to said end-of-packet reset signal, for discharging said data output signal stored by said second detector means to said third reference voltage wherein said third reference voltage corresponds to a voltage stored by said detector means during an absence of a received data input signal.

* * * * *